United States Patent [19]
Van Niekerk

[11] Patent Number: 5,730,397
[45] Date of Patent: Mar. 24, 1998

[54] ELECTRIC LAWNMOWER CABLE SUPPORTING DEVICE

[76] Inventor: Phillippus Rudolf Van Niekerk, Apt. 21-940 Lytton St., North Vancouver, Brittish Columbia, Canada, V7H 2A5

[21] Appl. No.: 694,622

[22] Filed: Aug. 9, 1996

[51] Int. Cl.$^6$ ............................................. H02G 3/00
[52] U.S. Cl. ....................... 248/52; 56/16.7; 248/65; 248/289.11
[58] Field of Search ........................... 248/51, 52, 49, 248/65, 289.11; 56/16.7; 191/12 R, 12.2 R

[56] References Cited

U.S. PATENT DOCUMENTS

| | | | |
|---|---|---|---|
| 2,682,609 | 6/1954 | Wampler | 248/289.11 X |
| 2,690,892 | 10/1954 | La Bar | 56/16.7 X |
| 2,720,560 | 10/1955 | Funk | 56/16.7 X |
| 2,775,087 | 12/1956 | Abel et al. | 56/16.7 |
| 3,586,275 | 6/1971 | Mittelstadt | 248/52 |
| 4,395,053 | 7/1983 | Kalfas | 248/52 X |

FOREIGN PATENT DOCUMENTS 2042326  9/1980  United Kingdom ............. 248/51

*Primary Examiner*—Derek J. Berger

[57] ABSTRACT

An electric lawnmower cable supporting device including a mower handle clamp adapted for securement to a U-shaped handle of a lawnmower. An adjustment clamp is secured to the mower handle clamp. An arm portion is secured to the adjustment clamp for extending over the head of a person operating the lawnmower to extend an extension cord freely over the user's head.

6 Claims, 3 Drawing Sheets

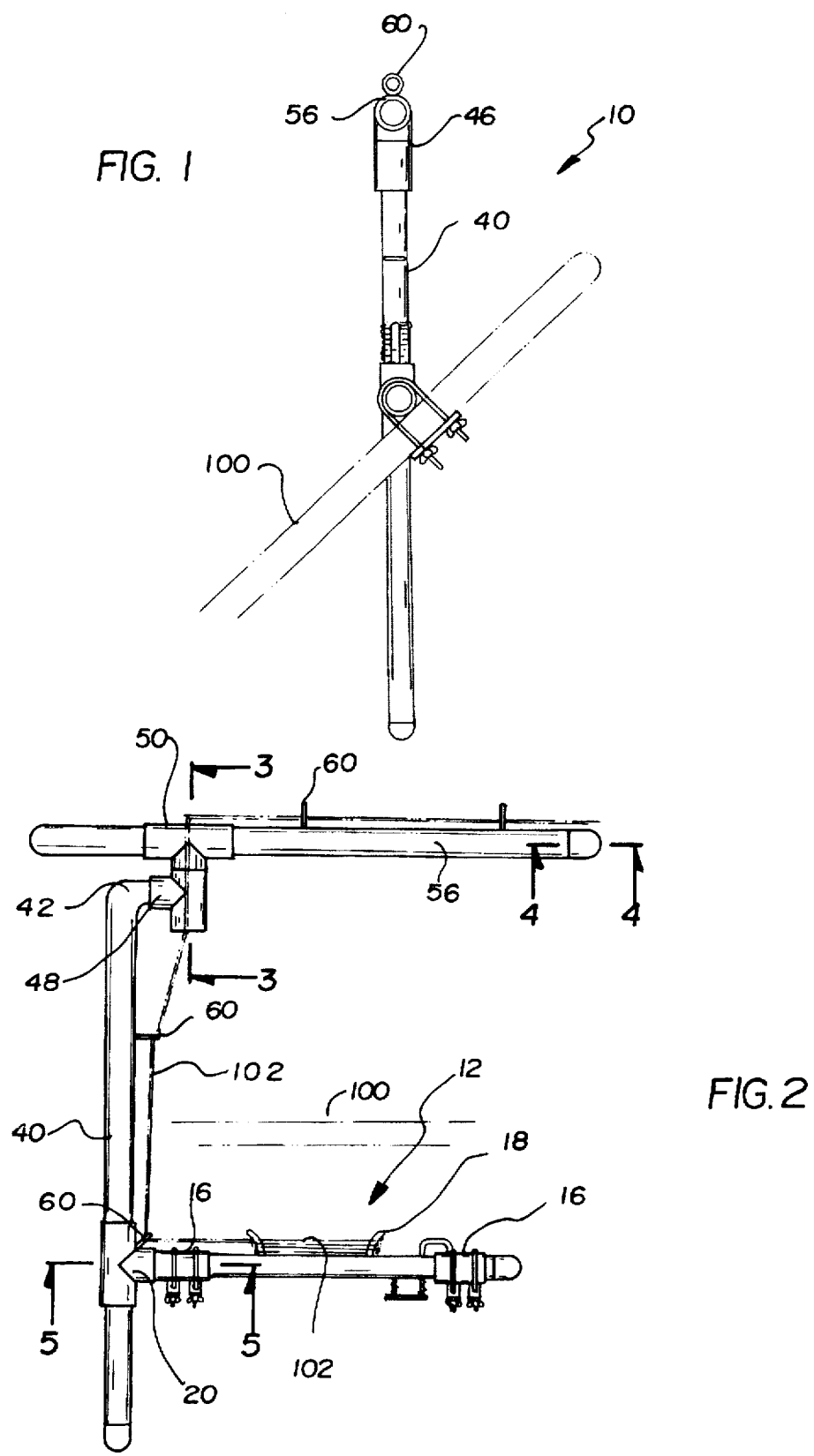

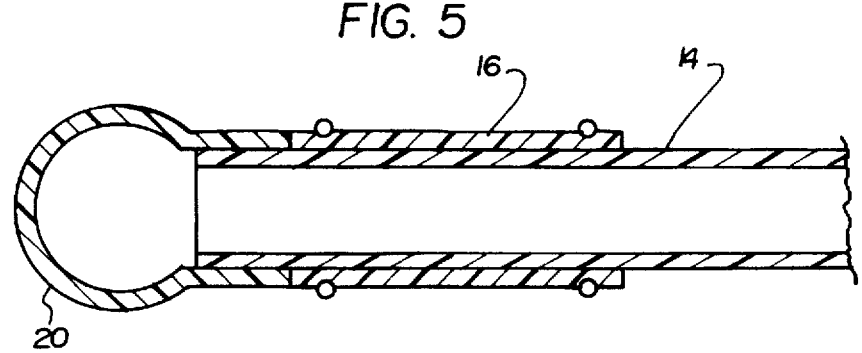
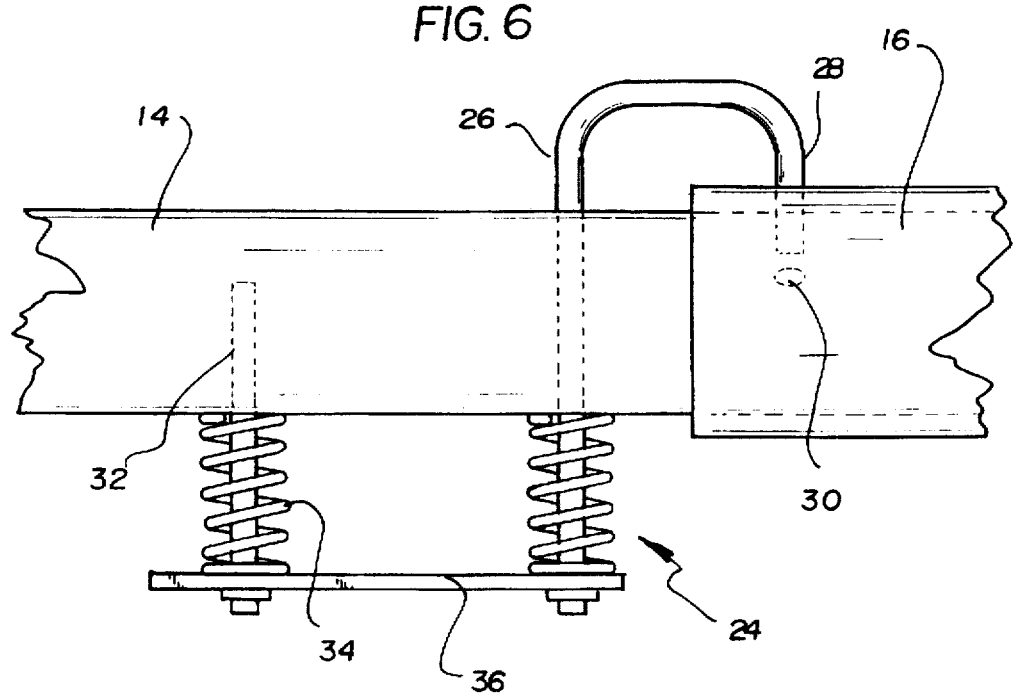

ELECTRIC LAWNMOWER CABLE SUPPORTING DEVICE

BACKGROUND OF THE INVENTION

1. Field of the Invention

The present invention relates to an electric lawnmower cable supporting device and more particularly pertains to holding a lawnmower cable behind and above an an operator's head with an electric lawnmower cable supporting device.

2. Description of the Prior Art

The use of support brackets for lawnmower cords is known in the prior art. More specifically, support brackets for lawnmower cords heretofore devised and utilized for the purpose of supporting a lawnmower cord are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,375,338 to Delf discloses an extension cord control assembly for electric mower.

U.S. Pat. No. 4,395,053 to Kalfas discloses an electric cord support bracket assembly for lawnmowers and the like.

U.S. Pat. No. 5,335,432 to Simpson discloses an ironing board with leg locking member and hanger attachment.

U.S. Pat. No. 5,396,915 to Bomar discloses a shading apparatus.

U.S. Pat. No. Des. 344,447 to Kuehl et al. discloses the ornamental design for a flagpole bracket.

While these devices fulfill their respective, particular objective and requirements, the aforementioned patents do not describe an electric lawnmower cable supporting device for holding a lawnmower cable behind and above an operator's head.

In this respect, the electric lawnmower cable supporting device according to the present invention substantially departs from the conventional concepts and designs of the prior art, and in doing so provides an apparatus primarily developed for the purpose of holding a lawnmower cable behind and above an operator's head.

Therefore, it can be appreciated that there exists a continuing need for new and improved electric lawnmower cable supporting device which can be used for holding a lawnmower cable behind and above an operator's head. In this regard, the present invention substantially fulfills this need.

SUMMARY OF THE INVENTION

In the view of the foregoing disadvantages inherent in the known types of support brackets for lawnmower cords now present in the prior art, the present invention provides an improved electric lawnmower cable supporting device. As such, the general purpose of the present invention, which will be described subsequently in greater detail, is to provide a new and improved electric lawnmower cable supporting device and method which has all the advantages of the prior art and none of the disadvantages.

To attain this, the present invention essentially comprises a mower handle clamp adapted for securement to a U-shaped handle of a lawnmower. The mower handle clamp comprises an elongated member having clamp portions disposed on opposing end portions thereof for securement to the U-shaped handle of the lawnmower. An upper surface of the elongated member has a reel secured thereto for wrapping slack of an extension cord therearound. A collar is secured to an outer end of the elongated member. The device includes a locking mechanism comprising a J-shaped member extending through the elongated member. An upper free end of the J-shaped member selectively engages an aperture in one of the clamp portions. An opposing member extends through the elongated member outwardly of the J-shaped member. A pair of springs are disposed on lower portions of the J-shaped member and the opposing member. A plate is secured to free ends of the J-shaped member and the opposing member. An elongated lower handle portion is slidably received within the collar of the mower handle clamp. The elongated lower handle portion has an outturned upper portion. The device includes a swivel mechanism having an open lower end portion receiving the outturned outer portion of the elongated lower handle portion therein. The swivel mechanism has an upper collar portion pivotally coupled to the open lower end portion thereof. The swivel mechanism has a hollow interior. An upper handle is slidably received within the upper collar portion of the swivel mechanism. The upper handle portion is parallel with the elongated member of the mower handle clamp. A plurality of eyelets are selectively disposed on the collar of the mower handle clamp, the elongated lower handle portion and the upper handle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electric lawnmower cable supporting device which has all the advantages of the prior art support brackets for lawnmower cords and none of the disadvantages.

It is another object of the present invention to provide a new and improved electric lawnmower cable supporting device which may be easily and efficiently manufactured and marketed.

It is a further object of the present invention to provide a new and improved electric lawnmower cable supporting device which is of durable and reliable construction.

An even further object of the present invention is to provide a new and improved electric lawnmower cable supporting device which is susceptible of a low cost of manufacture with regard to both materials and labor, and which accordingly is then susceptible of low prices of sale to the consuming public, thereby making such an electric lawnmower cable supporting device economically available to the buying public.

Still yet another object of the present invention is to provide a new and improved electric lawnmower cable supporting device which provides in the apparatuses and methods of the prior art some of the advantages thereof, while simultaneously overcoming some of the disadvantages normally associated therewith.

Even still another object of the present invention is to provide a new and improved electric lawnmower cable supporting device for holding a lawnmower cable behind and above an operator's head.

Lastly, it is an object of the present invention to provide a new and improved electric lawnmower cable supporting device including a mower handle clamp adapted for securement to a U-shaped handle of a lawnmower. An adjustment clamp is secured to the mower handle clamp. An arm portion is secured to the adjustment clamp for extending over the head of a person operating the lawnmower to extend an extension cord freely over the user's head.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the preferred embodiment of the electric lawnmower cable supporting device constructed in accordance with the principles of the present invention.

FIG. 2 is a front elevation view of the present invention.

FIG. 5 is a cross-sectional view as taken along line 5—5 of FIG. 2.

FIG. 6 is a front view of the locking mechanism for coupling with the existing lawnmower handle.

The same reference numerals refer to the same parts through the various Figures.

DESCRIPTION OF THE PREFERRED EMBODIMENT

Figure 3:
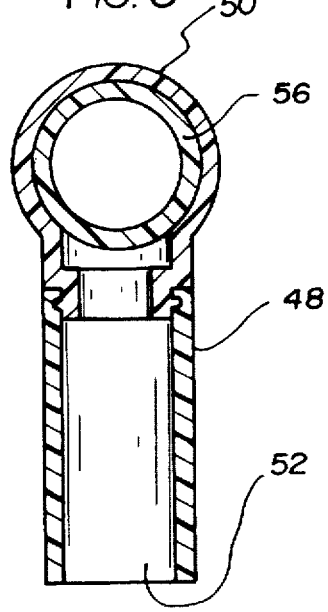
FIG. 3 is a cross-sectional view as taken along line 3—3 of FIG. 2.
Figure 4:
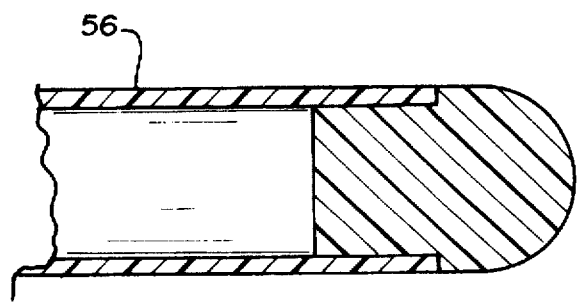
FIG. 4 is a cross-sectional view as taken along line 4—4 of FIG. 2.

With reference now to the drawings, and in particular, to FIGS. 1–6 thereof, the preferred embodiment of the new and improved electric lawnmower cable supporting device embodying the principles and concepts of the present invention and generally designated by the reference number 10 will be described.

Specifically, it will be noted in the various Figures that the device relates to a new and improved electric lawnmower cable supporting device for holding a lawnmower cable behind and above an operator's head. In its broadest context, the device consists of a mower handle clamp, a locking mechanism, an elongated lower handle portion, a swivel mechanism, an upper handle and a plurality of eyelets. Such components are individually configured and correlated with respect to each other so as to attain the desired objective.

The device 10 includes a mower handle clamp 12 adapted for securement to a U-shaped handle 100 of a lawnmower. The mower handle clamp 12 can be constructed to fit a variety of different sized lawnmowers. The mower handle clamp 12 is comprised of an elongated member 14 having clamp portions 16 disposed on opposing end portions thereof. An upper surface of the elongated member 14 has a reel 18 secured thereto for wrapping slack of an extension cord 102 therearound. A collar 20 is secured to an outer end of the elongated member 14.

The device 10 includes a locking mechanism 24 comprising a J-shaped member 26 extending through the elongated member 14. An upper free end 28 of the J-shaped member 26 selectively engages an aperture 30 in one of the clamp portions 16. An opposing member 32 extends through the elongated member 14 outwardly of the J-shaped member 26. A pair of springs 34 are disposed on lower portions of the J-shaped member 26 and the opposing member 32. A plate 36 is secured to free ends of the J-shaped member 26 and the opposing member 32. The springs 34 will serve to bias the plate 36 and thus the J-shaped member 26 and the opposing member 32 downwardly with respect to the elongated member 14 thereby causing the upper free end 28 to engage the aperture 30 in the clamp portion 16.

An elongated lower handle portion 40 is slidably received within the collar 20 of the mower handle clamp 12. The elongated lower handle portion 40 has an outurned upper portion 42.

The device 10 includes a swivel mechanism 46 having an open lower end portion 48 receiving the outurned outer portion 42 of the elongated lower handle portion 40 therein. The swivel mechanism 46 has an upper collar portion 50 pivotally coupled to the open lower end portion 48 thereof. The swivel mechanism 46 has a hollow interior 52.

An upper handle 56 is slidably received within the upper collar portion 50 of the swivel mechanism 46. The upper handle portion 56 is parallel with the elongated member 14 of the mower handle clamp 12.

A plurality of eyelets 60 are selectively disposed on the collar 20 of the mower handle clamp 12, the elongated lower handle portion 40 and the upper handle 56.

In use, the extension cord 102 is wrapped around the reel 18 and is then threaded through the eyelet 60 on the collar 20 and is then extended up through the eyelet 60 on the elongated lower handle portion 40 and then threaded through the hollow interior 50 of the swivel mechanism 46 to then be extended through the upper handle 56 and through the eyelets 60 disposed thereon. The cord is then extended to be plugged into an outlet. As the user is mowing the lawn, the device 10 will turn as the user turns the lawnmower thereby preventing the extension cord from becoming entangled or becoming severed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. AN electric lawnmower cable supporting device for holding a lawnmower cable behind and above an operator's head comprising, in combination:

a mower handle clamp adapted for securement to a U-shaped handle of a lawnmower, the mower handle clamp comprising an elongated member having clamp portions disposed on opposing end portions thereof for securement to the U-shaped handle of the lawnmower, an upper surface of the elongated member having a reel secured thereto for wrapping slack of an extension cord therearound, a collar secured to an outer end of the elongated member;

a locking mechanism comprising a J-shaped member extending through the elongated member, an upper free end of the J-shaped member selectively engaging an aperture in one of the clamp portions, an opposing member extending through the elongated member spaced from the J-shaped member, a pair of springs disposed on lower portions of the J-shaped member and the opposing member, a plate secured to lower free ends of the J-shaped member and the opposing member;

an elongated lower handle portion slidably received within the collar of the mower handle clamp, the elongated lower handle portion having an upper portion;

a swivel mechanism having an open lower end portion receiving the upper portion of the elongated lower handle portion therein, the swivel mechanism having an upper collar portion pivotally coupled to the open lower end portion thereof, the swivel mechanism having a hollow interior;

an upper handle slidably received within the upper collar portion of the swivel mechanism, the upper handle being parallel with the elongated member of the mower handle clamp;

a plurality of eyelets selectively disposed on the collar of the mower handle clamp, the elongated lower handle portion and the upper handle.

2. A cable supporting device comprising:

a mower handle clamp adapted for securement to a U-shaped handle of a lawnmower, the mower handle clamp comprising an elongated member having clamp portions disposed on opposing end portions thereof;

an arm portion having swivelling means secured to the mower handle clamp;

a locking mechanism comprising a J-shaped member extending through the elongated member, an upper free end of the J-shaped member selectively engaging an aperture in one of the clamp portions, an opposing member extending through the elongated member spaced from the J-shaped member, a pair of springs disposed on lower portions of the J-shaped member and the opposing member, a plate secured to lower free ends of the J-shaped member and the opposing member.

3. The cable supporting device as set forth in claim 2 wherein the arm portion includes an elongated lower handle portion slidably received within a collar of the mower handle clamp, the elongated lower handle portion having an upper portion.

4. The cable supporting device as set forth in claim 3 wherein the swivelling means comprises a swivel mechanism having an open lower end portion receiving the upper portion of the elongated lower handle portion therein, the swivel mechanism having an upper collar portion pivotally coupled to the open lower end portion thereof, the swivel mechanism having a hollow interior.

5. The cable supporting device as set forth in claim 4 wherein the arm portion further includes an upper handle slidably received within the upper collar portion of the swivel mechanism, the upper handle being parallel with the elongated member of the mower handle clamp.

6. The cable supporting device as set forth in claim 5 and further including a plurality of eyelets selectively disposed on the collar of the mower handle clamp, the elongated lower handle portion and the upper handle.

* * * * *